(12) United States Patent
Rissanen

(10) Patent No.: US 10,007,800 B2
(45) Date of Patent: Jun. 26, 2018

(54) REMOTE RULE EXECUTION

(71) Applicant: AXIOMATICS AB, Stockholm (SE)

(72) Inventor: Erik Rissanen, Stockholm (SE)

(73) Assignee: AXIOMATICS AB, Stockholm (SE)

( * ) Notice: Subject to any disclaimer, the term of this patent is extended or adjusted under 35 U.S.C. 154(b) by 178 days.

(21) Appl. No.: 15/047,239

(22) Filed: Feb. 18, 2016

(65) Prior Publication Data

US 2016/0246983 A1    Aug. 25, 2016

(30) Foreign Application Priority Data

Feb. 19, 2015  (EP) .................................... 15155835

(51) Int. Cl.
| | |
|---|---|
| *H04L 29/06* | (2006.01) |
| *G06F 21/62* | (2013.01) |
| *G06F 21/31* | (2013.01) |
| *G06F 21/45* | (2013.01) |
| *G06F 21/60* | (2013.01) |

(52) U.S. Cl.
CPC .......... *G06F 21/6218* (2013.01); *G06F 21/31* (2013.01); *G06F 21/45* (2013.01); *G06F 21/604* (2013.01)

(58) Field of Classification Search
CPC ........ G06F 21/31; G06F 21/45; G06F 21/604; G06F 21/6218; H04L 63/20
USPC ............................................... 726/1–4, 27–30
See application file for complete search history.

(56) References Cited

U.S. PATENT DOCUMENTS

| | | |
|---|---|---|
| 6,647,388 B2 | 11/2003 | Numao et al. |
| 6,757,680 B1 | 6/2004 | Choy |
| 6,880,005 B1 | 4/2005 | Bell et al. |
| 7,243,097 B1 | 7/2007 | Agrawal et al. |
| 7,281,003 B2 | 10/2007 | Lei et al. |
| 7,478,419 B2 | 1/2009 | Anderson et al. |
| 7,747,647 B2 | 6/2010 | Canning et al. |
| 7,779,057 B2 | 8/2010 | Betts et al. |
| 7,779,247 B2 | 8/2010 | Roegner |

(Continued)

FOREIGN PATENT DOCUMENTS

EP    2 631 841 A2    8/2013

OTHER PUBLICATIONS

European Search Report dated Nov. 18, 2015.

(Continued)

*Primary Examiner* — Hosuk Song
(74) *Attorney, Agent, or Firm* — Buchanan Ingersoll & Rooney P.C.

(57) ABSTRACT

In a policy decision point (500) coupled to at least one remote attribute source (107a-c), a method of transforming an attribute-based access control (ABAC) policy (106) to facilitate evaluation includes: identifying a functional expression (F1) of the ABAC policy; forming, based on the sub-hierarchy of the policy that has F1 as its hierarch, a remote query intended for a RAS such that the output data from execution of the remote query correspond to the outcome of an evaluation of F1; and transforming the ABAC policy by replacing the sub-hierarchy by a second functional expression that represents the remote query. A method of evaluating an access request against an ABAC policy includes using such a transformed ABAC policy. Furthermore, a method of evaluating an access request against an ABAC policy includes identifying remotely executable sub-hierarchies and delegating these to remote attribute sources.

23 Claims, 5 Drawing Sheets

(56) References Cited

U.S. PATENT DOCUMENTS

| | | | |
|---|---|---|---|
| 7,856,652 B2 | 12/2010 | Hieda | |
| 7,921,452 B2 | 4/2011 | Ridlon et al. | |
| 7,921,686 B2 * | 4/2011 | Bagepalli | H04L 63/166 |
| | | | 370/352 |
| 8,010,991 B2 | 8/2011 | Sarukkai et al. | |
| 8,024,771 B2 | 9/2011 | Malkin et al. | |
| 8,051,459 B2 * | 11/2011 | Zhang | G06F 21/57 |
| | | | 713/1 |
| 8,056,114 B2 | 11/2011 | Allen et al. | |
| 8,122,484 B2 | 2/2012 | Karjoth et al. | |
| 8,156,537 B2 | 4/2012 | Gomez et al. | |
| 8,250,526 B2 | 8/2012 | Anderson et al. | |
| 8,271,418 B2 | 9/2012 | Allen et al. | |
| 8,332,359 B2 | 12/2012 | Kreuch et al. | |
| 8,381,306 B2 | 2/2013 | McPherson et al. | |
| 8,434,125 B2 | 4/2013 | Ramesh et al. | |
| 8,458,764 B2 | 6/2013 | Karjoth et al. | |
| 8,543,606 B2 | 9/2013 | Pulfer et al. | |
| 8,560,836 B2 | 10/2013 | Roegner | |
| 8,601,549 B2 | 12/2013 | Dickerson | |
| 8,635,661 B2 * | 1/2014 | Shahbazi | H04L 63/083 |
| | | | 380/270 |
| 8,667,556 B2 | 3/2014 | Chang et al. | |
| 8,677,453 B2 * | 3/2014 | Chang | G06F 21/6218 |
| | | | 707/764 |
| 8,805,881 B2 | 8/2014 | Hom et al. | |
| 8,826,366 B2 | 9/2014 | Narain et al. | |
| 8,843,734 B2 * | 9/2014 | Lim | G06F 21/602 |
| | | | 713/150 |
| 8,881,226 B2 * | 11/2014 | Giambiagi | H04L 63/20 |
| | | | 726/1 |
| 8,966,576 B2 * | 2/2015 | Giambiagi | G06F 21/00 |
| | | | 707/759 |
| 2005/0166260 A1 | 7/2005 | Betts et al. | |
| 2006/0041666 A1 | 2/2006 | Karremans | |
| 2006/0230282 A1 | 10/2006 | Hauster | |
| 2009/0077621 A1 | 3/2009 | Lang et al. | |
| 2009/0205018 A1 | 8/2009 | Ferraiolo et al. | |
| 2009/0265780 A1 | 10/2009 | Korkus et al. | |
| 2010/0153695 A1 | 6/2010 | Bussard et al. | |
| 2010/0299738 A1 | 11/2010 | Wahl | |
| 2010/0325692 A1 | 12/2010 | Rissanen | |
| 2011/0314261 A1 | 12/2011 | Brucker et al. | |
| 2013/0036447 A1 | 2/2013 | Lassesen | |
| 2013/0239171 A1 | 9/2013 | Ramesh et al. | |
| 2014/0310254 A1 | 10/2014 | Hom et al. | |
| 2014/0317636 A1 | 10/2014 | Mattheis et al. | |
| 2015/0101014 A1 | 4/2015 | Giambiagi et al. | |

OTHER PUBLICATIONS

Guy Harison et al., "Push Down Queries", Mar. 27, 2014, 3 pages, XP-055226768, Retrieved from the Internet: URL:http://www.toadworld.com/products/toad-for-cloud-databases/w/wiki/327.push-down-queries.

Erik Rissanen, "Attributes of Relations Code Sample", Jan. 28, 2013, 4 pages.

Mohammad Jafari, "On Attributes of Relations and SQL Profile", Jan. 24, 2013, 4 pages.

Vincent C. Hu et al., Guide to Attribute Based Access Control (ABAC) Definition and Considerations, NIST Special Publication-tion 800-162, 46 pages.

Oasis eXtensible Access Control Markup Language (XACML) Version 3.0, Jan. 22, 2013, pp. 1-154.

\* cited by examiner

REMOTE RULE EXECUTION

TECHNICAL FIELD

The invention disclosed herein relates to the field of attribute-based access control (ABAC) in computer systems, and more particularly to methods and devices for transforming ABAC policies and evaluating access requests against ABAC policies.

BACKGROUND

Attribute-based access control (ABAC) is a known way to perform access control to resources. In ABAC, entities such as subjects, resources, actions, the environment, or other relevant entities, are described in terms of their attributes. An attribute may be assigned to reflect an identified property of such an entity, and an entity may have more than one attribute. Attributes of a subject may, for instance, be the subject's identity, or the subject's role in an organization.

A typical ABAC scenario is illustrated in FIG. 1a. In the figure, a subject (for example a user) 101 attempts to access a protected resource (for example a certain document) 102. The attempt is intercepted by a policy enforcement point (PEP) 103 which queries a policy decision point (PDP) 104 that will decide whether the subject 101 should be allowed access to the protected resource 102 or not. Along with, or included in, the access request 105, the PEP 103 can also include relevant attribute values, such as the identity of the subject 101 and the identity of the protected resource 102 that the subject 101 has attempted to access.

To make a decision, the PDP 104 evaluates the access request 105 against a policy 106. A policy 106 may reference attributes of entities and contain expressions of operators which operate on attribute values or the results of other expressions, and the policies may be expressed in a policy language such as for example the eXtensible Access Control Markup Language (XACML). Such a language may also be used to express the access request 105 sent from the PEP 103 to the PDP 104, and the same is true for an expected access decision 108 that is to be sent back to the PEP 103 from the PDP 104 after a decision has been made.

The values of attributes may come from various sources. They may be locally available in the PDP 104, either as provided by the PEP 103 (such as subject and resource identities, which may be included in the access request 105) or as other information objects available at the PDP 104, such as for instance the current system time or some other quantity that is independent of subject and resource. Values of attributes may be stored in, or made available via, a remote attribute source (RAS) and must then be remotely queried for. There may be multiple such RASs 107a-c, and some attributes may be available only after querying more than one RAS. Their values will then be a combined collection of the values which the various RASs have returned.

Remote attribute retrieval is typically configured such that there is a connector module that allows the PDP 104 to communicate with a RAS 107 by, typically, submitting a query to the RAS 107. The connector module has a configuration which contains the information required to connect to the RAS 107 which executes the query and returns the resulting values back to the connector module and the PDP 104. The connector module may be included in the PDP 104, or be located outside the PDP 104 in for example a policy information point (PIP, not shown) serving as an intermediary between the PDP 104 and a RAS 107. Independent of its location in this framework, a connector module may, however, be regarded as as a part of the PDP 104. After receiving the values of the remotely available attributes, the PDP 104 updates the policy 106 by substituting the values of the referenced attributes. After doing so, the PDP 104 evaluates the policy 106 and sends the access decision 108 back to the PEP 103. Based on the access decision 108, the PEP 103 finally either permits or denies the subject 101 access to the wanted protected resource 102, e.g. by selectively activating and deactivating hardware or software protection means.

The abovementioned way of evaluating an access request 105 against a policy 106 may lead to performance problems, in general, and inefficient use of network capacity in particular. This is true especially if the set of values that needs to be returned to the PDP 104 from the RAS 107 is large. For instance, it may be desirable to have an ABAC policy 106 which permits access to a resource 102 only once for a given subject (user) 101. Such a situation can be modeled by defining a multi-valued attribute on the resource 102 called "accessed_by_users", and let the values of this attribute be the identities of the users who have accessed the resource 102 previously. Accordingly, the ABAC policy 106 will deny access if the identity of the user 101 attempting to access the resource 102 is found among the values of this attribute. However, if the resource is accessed by many users, the set of values in the multi-valued attribute "accessed_by_users" will grow large, and many values will need to be transferred from the remote attribute source to the PDP 104 before the PDP 104 can determine whether the identity of a user is to be found among the set of values of the attribute. There will also be a need for the PDP 104 to cache the received attribute values locally. This may lead to the above mentioned issues.

In the light of the above, an improved way of evaluating an access request against an ABAC policy 106 is thus required that reduces the needed amount of network capacity and PDP-side memory.

SUMMARY

An object of the present invention is therefore to at least partially fulfill the requirements specified above. This and other objects of the invention are at least partially met by the invention as defined in the independent claims, while preferred embodiments are set forth in the dependent claims. The present invention is based on the insight that an ABAC policy can be transformed, either before or during evaluation, such that parts of it can be evaluated remotely, and directly, at a RAS. This may reduce the amount of attribute values that need to be transferred from the remote attribute source to the PDP, and it may as well reduce the computational load on the PDP.

Within a first aspect of the present invention, a computer-implemented method is provided that transforms an ABAC policy in order to facilitate evaluation in a PDP of an access request against the policy. The policy includes a number of functional expressions that are hierarchically ordered, such that one or more of the functional expressions has at least one other functional expression and/or an attribute as a subordinate. As used herein, a functional expression may operate on a set of zero or more inputs to produce a set of one or more outputs. An input, or output, may be a value or another functional expression, and a functional expression may contain one or more mathematical operators (e.g. Boolean operators, (in)equality, arithmetic operators, standard functions). Examples of functional expressions include, but is not limited to, the functions given in the XACML specifications referenced above.

A functional expression may also contain instructions for the evaluator (e.g. a PDP) to perform, such as for example information about a specific query and information about where said query is to be sent and executed, and how the resulting data are to be handled when returned. By "hierarchically ordered", it is meant that the functional expressions of the policy are ordered such that an expression E1, whose output serves as a direct input to another expression E2, is said to be lower in the hierarchy than said expression E2 (that is, E1 is an immediate subordinate to E2). Likewise, if the output of E2 in turn serves as the direct input to a third expression E3, the expression E1 is also a subordinate to E3, although not an immediate one. Attributes are at the bottom of the hierarchy, and they only serve as inputs to functional expressions higher up in the hierarchy, and attributes do therefore not have subordinates of their own.

An attribute can be such that its value is locally available at the PDP (i.e., the value of the attribute may for example have been cached at the PDP during an earlier evaluation, or the value may have been sent to the PDP in connection with a received access request, from or via e.g. a PEP or a context handler). The value of an attribute may also be remotely available to the PDP, in response to a query submitted from the PDP to one of the at least one RAS. In order to communicate, the PDP is communicatively connected to the at least one RAS over a communication link. Such a link is preferably a data network, such as a local area network or a wide area network such as the Internet, but other variants may also be conceivable as long as the PDP is able to send a query to the at least one RAS, and receive the output data from the execution of such a query in return. In all practical circumstances, the communication link has limited bandwidth, and/or is used by competing data traffic.

In the first aspect, the method may comprise the following:
  a first functional expression containing at least one mathematical operator is identified in the ABAC policy;
  on the basis of a sub-hierarchy having the first functional expression as its hierarch, a remote query intended for a first RAS is formed in such manner that output data from execution of the remote query correspond to the outcome of an evaluation of the first functional expression; and
  the ABAC policy is transformed by replacing the sub-hierarchy by a second functional expression that represents the remote query.

When transforming a policy, the changes performed, such as the replacement of one functional expression with another, can be done either directly to the policy specification itself, or to a copy of the policy specification. An advantage of such a method is that by transforming the policy by replacing a functional expression (and the sub-hierarchy in which the functional expression is a hierarch) by another functional expression representing a remote query, the future evaluation of the policy may be facilitated. At a later stage, a PDP can avoid having to first collect (often a large number of) attribute values by querying a RAS and then evaluate a certain functional expression based on the collected attribute values. Instead, using the transformed policy containing the second functional expression, the represented remote query can be sent directly to the RAS and only the outcome of the query (corresponding to the outcome of the evaluation of the first functional expression) is needed to be sent back to the PDP. Thus, less information has to be transferred from the RAS to the PDP, across the communication link connecting the two, and the communication link may then be implemented in a less costly manner.

In one example embodiment, the sub-hierarchy is remotely executable in the first RAS. A sub-hierarchy that is remotely executable in a certain RAS contains no attributes that are only available to the PDP from a RAS other than the certain RAS. Since a remotely executable sub-hierarchy does not reference data from two different RASs, evaluation of such a sub-hierarchy may advantageously require less data to be transferred to and from the evaluating PDP, especially if the sub-hierarchy is evaluated directly at the RAS and only the outcome of the evaluation is transferred back to the PDP.

In a further example embodiment, the first functional expression may be determined by searching, among the hierarchically ordered functional expressions of the ABAC policy, for a functional expression having a subordinate attribute that is available from a RAS and being such that any further subordinate attribute is either locally available or available from said RAS. Identifying such a functional expression is advantageous in that the sub-hierarchy of which the functional expression is the hierarch will be remotely executable in the RAS. In a still further example embodiment, the remotely executable sub-hierarchy is maximal, in the sense that it is the largest possible (in terms of member count) remotely executable sub-hierarchy containing the first functional expression. The benefits, in terms of network and computational load, of identifying and evaluating a remotely executable sub-hierarchy may be further increased by identifying a larger such sub-hierarchy.

In one example embodiment, the second functional expression contains an attribute which is locally available at the PDP and, in a still further example embodiment, the second functional expression is evaluable without requiring attribute values from any RAS. Locally available attributes are advantageous in that they themselves require no extra information to be sent to the PDP, and a functional expression that does not require attribute values to be sent from any RAS (i.e., an expression that only contains locally available attributes) may be especially beneficial to evaluate in terms of network and computational demand.

In one example embodiment, the forming of the remote query includes determining a type of RAS and selecting a language in which to form the remote query in accordance herewith. In a further example embodiment, the first RAS is an SQL database, an LDAP directory, an OData service, an RDF database (accepting e.g. SPARQL as a query language), a Hive service (accepting e.g. HiveQL as a query language), or a combination of these. The first RAS, or any other RAS involved, can be of any type suitable for providing the attribute values required by the PDP during the evaluation.

In one example embodiment, the second functional expression may comprise at least one attribute whose value is remotely available only from a RAS other than the first RAS. In this case, when evaluating the transformed policy, the value of the at least one attribute may be received by the PDP in advance and then sent on to the first RAS on which the query is to be executed. It may also be that the first RAS itself is in connection with the other RAS, and they query can then include instructions of how the first RAS should proceed in order to achieve the attribute values not available from itself.

In one example embodiment, the second functional expression represents a remote query that returns output data in conformity with a standard data type. Examples of standard data types may include, but are note limited to, booleans, integers, floats, characters, blobs, and empty values. The transformed policy may also contain a third functional expression to which the second functional expression is subordinate. The third functional expression is configured to receive the output data from execution of the remote query, and to output, based thereon, a value in conformity with an ABAC-specific data type. For instance, the output from the third functional expression may be an access decision such as "Permit" or "Deny", or an ABAC-specific state such as "Not applicable" or "Indeterminate".

In one example embodiment, at least one of the attributes referenced by the remotely executable sub-hierarchy is a multi-valued attribute. As an example, the attribute may correspond to multiple values in the form of a list, a bag, an array, a matrix, a value-key pair or any other data structure suitable for containing multiple values.

Within a second aspect of the present invention, an ABAC policy transformer is provided. The transformer is configured to transform an ABAC policy to facilitate evaluation in a PDP of an access request against the policy. The ABAC policy transformer comprises a memory and a processor, where the processor is configured to at least:
  identify a first functional expression that contains at least one mathematical operator;
  form, on the basis of a sub-hierarchy having said first functional expression as its hierarch, a remote query intended for a first RAS in such manner that output data from execution of the remote query correspond to the outcome of an evaluation of the first functional expression; and
  transform the ABAC policy by replacing the remotely executable sub-hierarchy by a second functional expression representing the remote query.

The ABAC policy transformer is configured to perform the steps of the method according to the above first aspect. The technical effects and advantages of the first aspect are equally applicable to the transformer.

Within a third aspect of the present invention, a computer-implemented method of evaluating an access request against an ABAC policy is provided. The method is implemented in a PDP, which is communicatively coupled over a communication link to at least one RAS, and the method may comprise the following:
  an access request intended for an ABAC policy is received;
  a transformed ABAC policy, equivalent to said ABAC policy, is obtained, where the transformed ABAC policy contains at least one functional expression that represents a remote query to one of the at least one RAS;
  an evaluation of the access request against the transformed ABAC policy is initiated and, when the at least one functional expression is encountered, the remote query to said one RAS is generated, executed and the resulting output data received and propagated into the subsequent evaluation of the access request.

In one example embodiment, an access decision may be assigned in response to the received output data resulting from the execution of the remote query. The access decision may be propagated into the subsequent evaluation of the access request, and the decision may for example be "Permit" or "Deny".

In one example embodiment, the functional expression may represent a remote query that comprises at least one attribute, wherein the remote query is generated on the basis of the value of the at least one attribute. For instance, the PDP may be communicatively coupled to at least two RASs, and the remote query may comprise at least one attribute whose value is remotely available only from a RAS other than said one RAS. In such circumstances, the method may further include that an attribute value from said one other RAS is retrieved, and that the remote query is generated on the basis of the retrieved attribute value. If, for example, the remote query comprises a plurality of attributes whose values are available to the PDP from a first RAS, and if the remote query also comprises an attribute available to the PDP only from a second RAS different from the first RAS, the remote query may still be remotely executed on the first RAS if only the attribute value available only from the second RAS is first retrieved before the remote query for the first RAS is generated. Advantageously, this avoids the need to query a particular RAS several times during the same evaluation and so may reduce the amount of network traffic to and from the PDP.

Within a fourth aspect of the present invention, a PDP adapted to evaluate an access request against an ABAC policy is provided. The PDP is communicatively coupled to at least one RAS, and contains at least a memory and a processor. The processor is configured to at least:
  receive an access request intended for an ABAC policy;
  obtain a transformed ABAC policy equivalent to said ABAC policy, where the transformed ABAC policy comprises at least one functional expression that represents a remote query to one of the at least one RAS; and
  initiate evaluation of the access request against the transformed ABAC policy, including generating, in response to encountering said functional expression, the remote query to said one RAS, executing the query and receiving output data from the execution, wherein the received output data are propagated into the subsequent evaluation of the access request.

The PDP is configured to perform the steps of the method according to the above third aspect. The technical effects and advantages of the the third aspect and its embodiments are equally applicable to the PDP.

Within a fifth aspect of the present invention, a computer implemented method of evaluating an access request against an ABAC policy in a PDP is provided. The PDP is communicatively coupled over a communication link to at least one RAS, and the method may comprise the following:
  an access request intended for the ABAC policy is received;
  an evaluation of the access request against the ABAC policy is initiated, and a first functional expression that comprises at least one mathematical operator is identified in the ABAC policy;
  on the basis of a sub-hierarchy that has the first functional expression as its hierarch, a remote query intended for a first RAS is formed in such manner that output data from execution of the remote query correspond to the outcome of an evaluation of the first functional expression; and
  the remote query is executed and the output data from the execution is received and propagated into the subsequent evaluation of the access request.

Within a sixth aspect of the present invention, a PDP adapted to evaluate an access request against an ABAC policy is provided. The PDP is communicatively coupled to at least one RAS, and contains at least a memory and a processor. The processor is configured to at least:

receive an access request intended for an ABAC policy;

initiate evaluation of the access request against the ABAC policy, including to identify, in the ABAC policy, a first functional expression comprising at least one mathematical operator;

form, on the basis of a sub-hierarchy having said first functional expression as its hierarch, a remote query intended for a first RAS in such manner that output data from execution of the remote query correspond to the outcome of an evaluation of the first functional expression; and execute the remote query and receive output data from the execution, wherein the received output data are propagated into the subsequent evaluation of the access request.

The teachings of the first and third aspects and their embodiments may be advantageously applied also to the fifth and sixth aspects.

Within a seventh aspect of the present invention, a computer program product comprising a computer-readable medium is presented, where the computer-readable medium has instructions for causing a programmable computer to perform any of the methods outlined above.

It is noted that the invention relates to all combinations of features, even if recited in mutually different claims.

BRIEF DESCRIPTION OF THE DRAWINGS

The present invention will now be described more fully with reference to the accompanying drawings, on which.

Unless explicitly stated to the contrary, the drawings show only such elements that are necessary to illustrate the example embodiment, while other elements, in the interest of clarity, may be omitted or merely suggested.

DETAILED DESCRIPTION OF EXAMPLE EMBODIMENTS

For illustrative purposes, the scenario shown in FIG. 1b and FIGS. 2a-2c may be considered. Here, an ABAC policy 106 utilized to allow (or deny) a subject (a user) 101 access to certain resources (such as documents, databases, images, etc.) 102 depends on the following attributes:

UserId, whose value is provided by the PEP 103 on the basis of an access request that the PEP 103 receives. This attribute represents the identity of the user 101, and is locally available to the PDP 104, 500;

ResourceId, also provided by the PEP 103. This attribute represents the identity of the resource 102 the user 101 wants to access;

UserRole (RA1), stored in a database RolesDB at a first remote attribute source RAS1 107a. This attribute is multi-valued and represents the set of roles which has been assigned to a certain user 101. The attribute is available to the PDP 104, 500 by a remote query to RAS1 107a based on UserId;

ResourceRole (RA2), also stored in the database RolesDB at RAS1 107a. This attribute is multi-valued and represents the set of roles that may access a certain resource 102. Available from RAS1 107a based on ResourceId;

UserPreviousClient (RA3), stored in a database ClientDB at a second remote attribute source RAS2 107b. This attribute is multi-valued and represents the set of clients which the user (having a certain UserId) 101 has previously worked with. The attribute is available to the PDP 104, 500 by a remote query to RAS2 107b based on UserId;

ResourceConflictOfInterest (RA4), also stored in the database ClientDB at RAS2 107b. This attribute is multi-valued and represents the set of clients who are competitors of the client who owns a certain resource 102. Available from RAS2 107b based on ResourceId.

In the example scenario, the ABAC policy 106 permits access if the user 101 has been assigned to any role that the resource 102 has been assigned to as well, unless the user 101 has worked with any client who has a conflict of interest with the resource owner. Such a policy can be expressed, using non-standardized language, as Policy (P) [deny takes precedence over permit]:
  Rule 1 (R1): permit if any value in UserRole (RA1) is equal to any value in ResourceRole (RA2);
  Rule 2 (R2): deny if any value in UserPreviousClient (RA3) is equal to any value in ResourceConflictOfInterest (RA4).

Figure 1A:
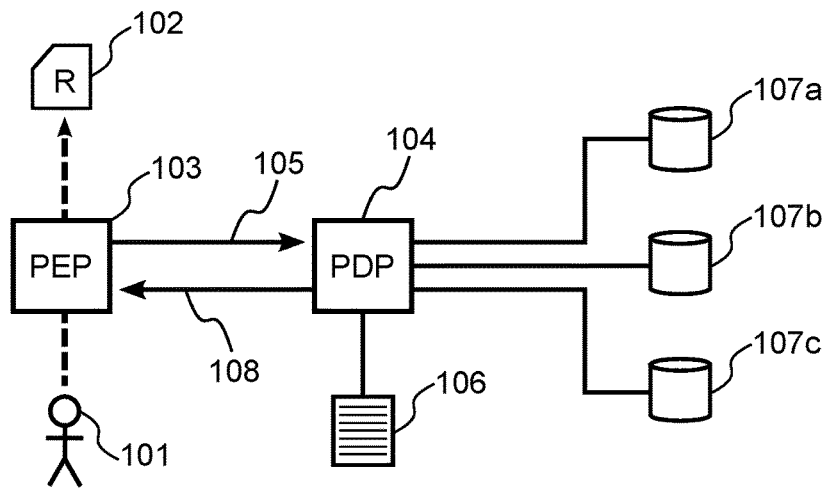
FIG. 1a is block diagram of a typical ABAC scenario.
Figure 1B:
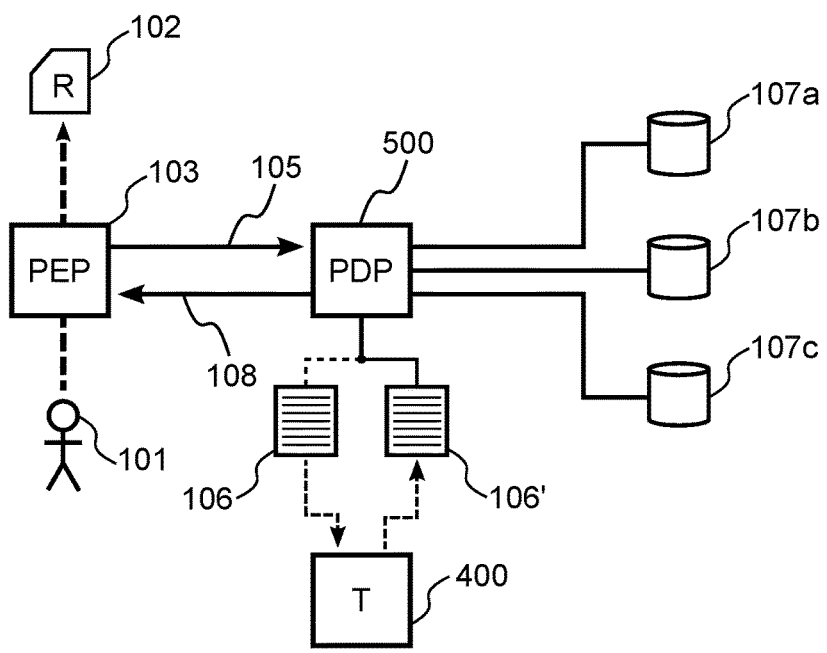
FIG. 1b is a block diagram of an ABAC scenario modified according to an example embodiment.
Figure 2A:
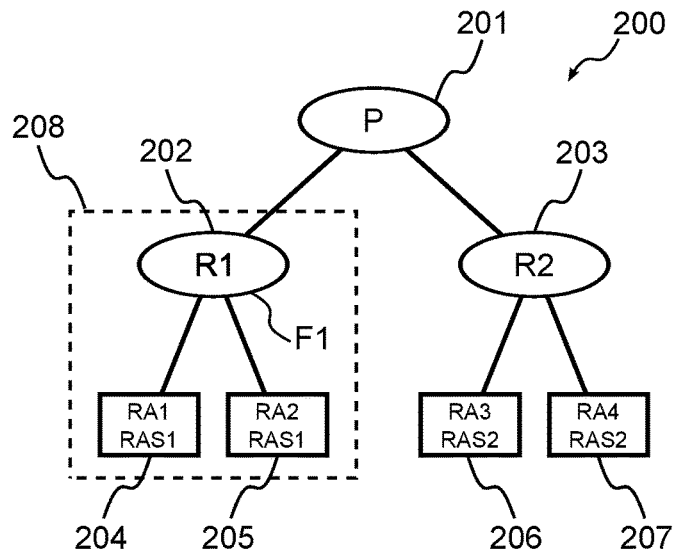
FIGS. 2a-2c are diagrammatic views of an ABAC policy transformed in accordance with an example embodiment.

The hierarchy of the policy may be represented as a tree-like structure, in which the leaf nodes are constant values or references to attributes, and in which the inner nodes contain functional expressions (e.g. rules) that operate on other inner nodes or on leaf nodes. Such a policy tree 200 is illustrated in FIG. 2a, where the root node 201 corresponds to the policy P itself, and where the inner nodes 202 and 203 correspond to the rules R1 and R2 with their relevant attributes RA1-RA4 as leaf nodes 204-207. The locally available attributes UserId and ResourceId are not shown, and are assumed to be included implicitly when needed. As is indicated in FIG. 2a, the attributes RA1-RA2 are available to the PDP 104, 500 by querying RAS1 107a, while the attributes RA3-RA4 are available by querying RAS2 107b.

A conventional policy evaluation method may need to query the remote attribute sources and collect all the values of each multi-valued attribute RA1-RA4 at the PDP 104. To receive for example the set of values for RA1, the PDP 104 would have to remotely query RAS1 107a by the use of a statement (here written using SQL syntax) like:

SELECT Roles as UserRole FROM tblUserRole WHERE UserId=@UserId;

After substituting the correct value for @UserId (which is available to the PDP 104 locally), the method would execute the query at RAS1 107a, and the resulting output data (i.e. the set of values for RA1) would be sent back from RAS1 107a to the PDP 104. Then, after similar queries had been sent for all the attributes RA2-RA4 (including executing queries on also RAS2 107b), and after the values had been transferred from the RASs to the PDP 104, the evaluating PDP 104 would use built-in functionality to compare and check if for example any of the values of RA1 existed also in RA2, or if any of the values of RA3 existed also in RA4. Only after completing all these steps would it be possible to evaluate the rules R1 and R2 and also the full policy, whereby an access decision 108 would be sent back to the PEP.

Figure 6:
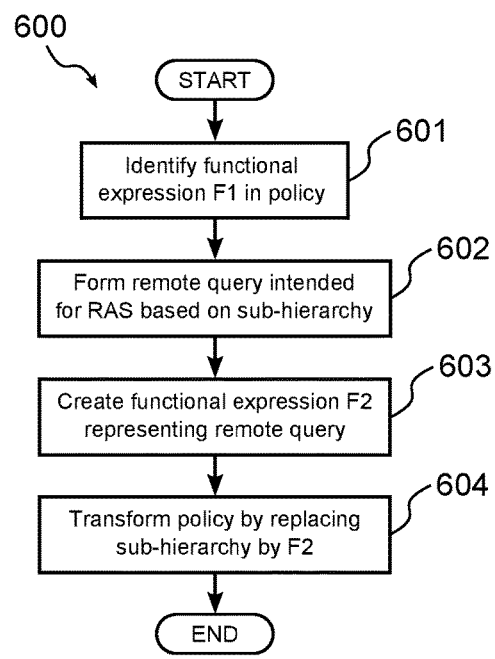
FIG. 6 is a flowchart of a method of transforming an ABAC policy in accordance with an example embodiment.

In contrast to this, according to an example embodiment, a method 600 of transforming an ABAC policy is illustrated by the flowchart in FIG. 6. The method 600 begins by first (step 601) identifying a first functional expression F1. In the current example, F1 is found to be the first rule R1 at node 202 of the policy 200. After F1 is identified, a query intended for RAS1 is formed based on the sub-hierarchy 208 of the policy that has F1 as its hierarch (step 602). Since the first rule checks if the user has been assigned any of the roles which may access the resource, the query intended for RAS1 may comprise (if SQL syntax is used) a statement:

```
SELECT COUNT(*) AS I1 FROM
(    SELECT Roles FROM tblUserRole WHERE UserId = @UserId
     INTERSECT
     SELECT Roles FROM tblResourceRole WHERE ResourceId =
     @ResourceId ) I;
```

Figure 2B:
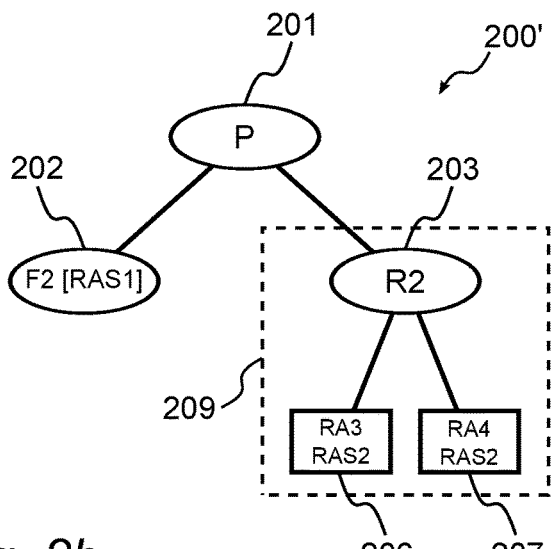

When executed, such a remote query will return output data being a single integer I1 that is either larger than or equal to zero, and the output data will thus correspond to an evaluation of F1 (i.e. R1). If I1 is zero, R1 will evaluate to "Deny", or, if I1>0, R1 will evaluate to "Permit". After the remote query is formed it is represented by a second functional expression F2 (step 603), and the policy 200 is transformed by replacing the sub-hierarchy 208 with the second functional expression F2 (step 604). The transformed policy tree 200' is illustrated in FIG. 2b, wherein the functional expression F2 is located at the node 202.

Optionally, another functional expression (the second rule R2 at node 203) may be identified and a remote query intented for RAS2 may be formed based on the corresponding sub-hierarchy 209. Still using SQL syntax, such a remote query intended for RAS2 may comprise the statement:

```
SELECT COUNT(*) AS I2 FROM
(    SELECT Clients FROM tblUserPreviousClient WHERE UserId =
     @UserId
     INTERSECT
     SELECT Clients FROM tblResourceConflictOfInterest WHERE
     ResourceId = @ResourceId ) I;
```

Figure 2C:
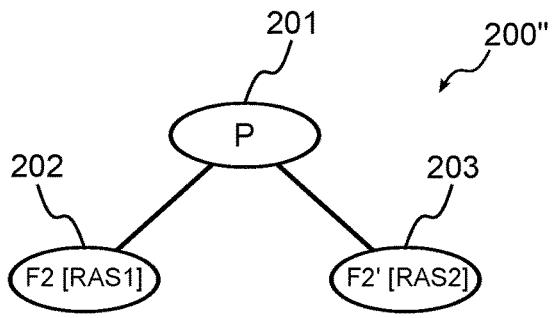

As before, the execution of such a remote query will generate output data in the form of a single integer I2 that corresponds to the evaluation of the second rule, R2. This time, a value equal to zero will correspond to R2 evaluating to "Permit", and the situation I2>0 will correspond to R2 evaluating to "Deny". As is illustrated in FIG. 2c, the transformed policy 200' may be further transformed by replacing the sub-hierarchy 209 with a functional expression F2' representing the query intended for RAS2. The expression F2' is located at the node 203 in the further transformed policy tree 200".

After the transformation, the transformed policy 106' may be stored such that it may later be accessed by a PDP 500 desiring to evaluate an access request against the policy. The storing may either take place by replacing the initial policy 106 with the transformed policy 106', or by storing the transformed policy 106' as a separate copy.

Figure 4:
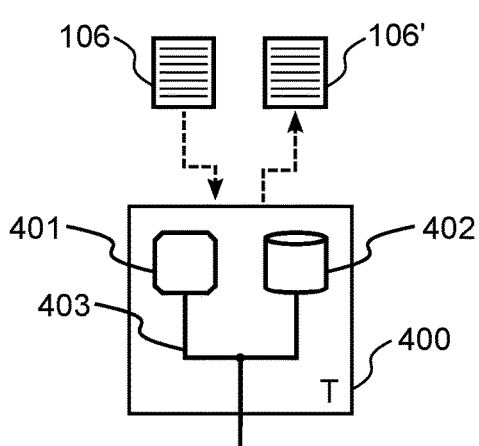
FIG. 4 is a block diagram of a policy transformer, in accordance with an example embodiment.

A policy transformer according to an example embodiment is illustrated in FIG. 4. The transformer 400 comprises a processor 401 that is configured to perform the steps in the transformation method outlined above, using a working memory 402 to which the processor is communicatively coupled via a communication link 403. The policy transformer 400 may be a separate physical entity or may be integrated in the PDP 500. The transformation of a policy may be done at any time, and several policies may be transformed, and optionally stored, at once. If not already transformed, a policy may be transformed at the time of an incoming access request to the PDP 500. The PDP 500 and the policy transformer 400 may be integrated together, or the PDP may send a transformation request to the policy transformer, that in turn creates a transformed policy that the PDP then can obtain and use. Functionally, the policy transformer 400 may be considered a part of the PDP 500, even though the transformer 400 may be located at a physical location different from that of the PDP 500.

By transforming the policy 106, an evaluation of an access request against the policy in a PDP 500 may be facilitated. For example the multi-valued attributes RA1-RA2 may occupy considerable memory space or bandwidth, and a conventional evaluation method may need to transfer all of the values from RAS1 to the PDP 104 before the policy 106 could be evaluated. This would possibly consume large amounts of network capacity when the process was upscaled to enterprise dimensions. Also, finding the intersection between the two sets of variables would be likely to consume considerable processing power, and optimized algorithms would need to be developed in order to at least partially reduce this consumption. Instead, by the present example embodiment, the method of transforming an ABAC policy 106 allows a PDP 500, using the transformed policy 106' during a future evaluation, to send and execute queries directly at RAS1, and only transfer a limited number of values back. Likewise, if the further transformed policy 200" in FIG. 2c is used, a reduction in data sent from RAS2 to the PDP 500 may also be achieved. It can also be assumed that the functionality already built into a RAS, such as that of an SQL database or similar, is already highly optimized, and thus more suitable for performing e.g. set-operations such as intersect, join, union, etc., compared to a generic PDP.

In a second example ABAC scenario, the following attributes are defined in an ABAC policy 106:

SubjectId (LA1), locally available at the PDP 104, 500;

ResourceId (LA2), locally available at the PDP 104, 500;

ResourceOwner (RA1), stored in a database DB1 at a first remote attribute source RAS1 107a, based on ResourceId;

ResourceOrganization (RA2), stored in the database DB1 at RAS1 107a, based on ResourceId; and SubjectOrganization (RA3), stored at a database DB2 at RAS2 107b, based on SubjectId.

If a part of the policy 106, governing the behaviour of an access control mechanism that selectively provides access to a resource 102, requires that a user (subject) 101 must be the owner of the resource 102, and that the user 101 and resource 102 be part of the same organization, that part of the policy 106 can be formulated (using non-standardized language) as:

```
● AND
    ○ EQUALS (=)
        ■ SubjectID (LA1)
        ■ ResourceOwner (RA1)
    ○ EQUALS (=)
        ■ ResourceOrganization (RA2)
        ■ SubjectOrganization (RA3)
```

Figure 3A:
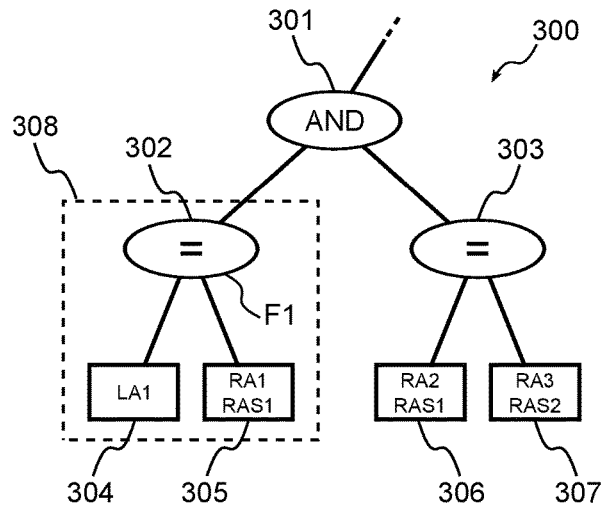
FIGS. 3a-3e are diagrammatic views of another ABAC policy transformed in accordance with an example embodiment.

The sub-branch 300 of the policy tree corresponding to the above part of the policy 106 is illustrated in FIG. 3a, where the AND-condition is the functional expression of the top node 301, and the two EQUALS-conditions are functional expressions of the inner nodes 302 and 303. The locally available attribute LA1 is the first leaf node 304, the remotely available attributes RA1-RA2 from RAS1 are the leaf nodes 305-306 and the remotely available attribute RA3 from RAS2 is the leaf node 307. The locally available attribute LA2 is not shown.

Figure 3B:
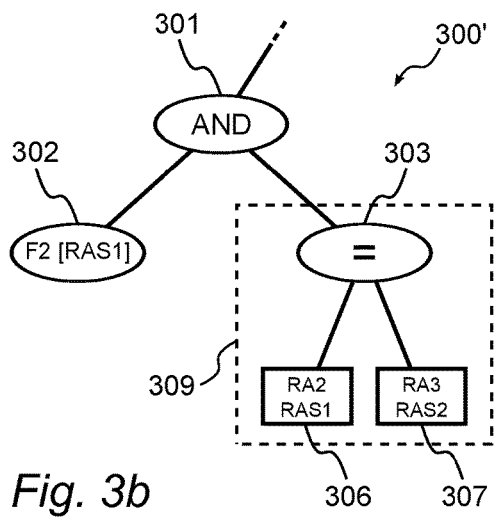

According to an example embodiment, the method of transforming a policy 106 can, just as in the previous example, once again start by identifying a first functional expression F1, form a remote query intended for RAS1 107a, based on the sub-hierarchy 308 having F1 as its hierarch, and then transform the policy by replacing F1 with a second functional expression F2 representing the remote query (as is illustrated in FIG. 3b, where the transformed policy 200' now contains F2 at the node 302).

The transformation above is proper, because in the sub-hierarchy (or sub-branch) 308,

```
    ○ EQUALS (=)
        ■ SubjectID (LA1)
        ■ ResourceOwner (RA1),
``` both leaf-nodes 304 and 305 references attributes that are either locally available (such as LA1) or available by querying a single RAS (RAS1 107a). A possible remote query may comprise a statement like:

```
SELECT COUNT(*) AS I1 FROM tblResourceOwner WHERE
ResourceId = @ResourceId AND Owner = @SubjectId;
``` where a single returned integer I1 larger than zero will correspond to the sub-hierarchy (F1) evaluating to "True" (or, equivalently, to "Permit"). An integer I1 equal to zero will correspond to F1 evaluating to "False" (or, equivalently, "Deny").

The other inner node 303, however, operates on attributes that are available from two different RAS's (node 306 is available from RAS1 107a, and node 307 is available from RAS2 107b). The sub-hierarchy 309 (in FIG. 3b),

```
    ○ EQUALS (=)
        ■ ResourceOrganization (RA2)
        ■ SubjectOrganization (RA3),
``` is then, in the terminology of the present disclosure, not remotely executable in RAS1 107a. It can, however, serve as basis for an additional remote query intended for RAS1 107a that also comprises an attribute that is remotely available from RAS2 107b. As an example, such a remote query intended for RAS1 107a may comprise a statement like:

```
SELECT COUNT(*) AS I2 FROM tblResourceOrganization WHERE
ResourceId = @ResourceId AND Organization =
@SubjectOrganization;
``` where the value of @SubjectOrganization has to be retrieved from RAS2 107b during evaluation, and then inserted into the remote query intended for RAS1 107a.

Figure 3D:
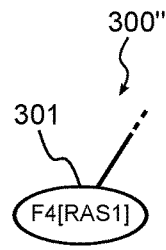
Figure 3C:
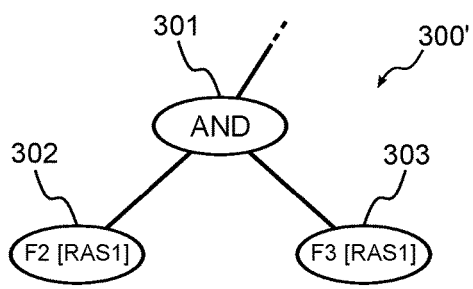

If the additional remote query intended for RAS1 107a has been formed, the sub-hierarchy 309 may be replaced with a functional expression F3, representing the additional remote query, in the transformed policy 300' (as is illustrated in FIG. 3c, where F3 is located at the node 303). Instructions on how the value of @SubjectOrganization can be retrieved from RAS2 107b may also be included in the functional expression F3, for example by including a statement such as SELECT Organization FROM tblSubjectOrganization
WHERE SubjectId=@SubjectId;

Even though, in this example, queries have to be sent to both RAS1 107a and RAS2 107b, limiting the total number of queries that have to be sent to each RAS can still be beneficial as long as less data (in total) have to be transferred from the RASs to a PDP 500 evaluating an access request against a transformed policy 106'. A conventional evaluation method may need to send at least one query to RAS1 107a (to retrieve the value of RA1) in order to evaluate node 302, and at least one additional query to each of RAS1 107a and RAS2 107b (to retrieve RA2 and RA3) in order to evaluate node 303. Then, after completing sending the queries and receiving the raw attribute values back, the values would have to be compared to each other, which would possibly require extra functionality to be added to the PDP 104. If the inner nodes were to depend on more attributes from each RAS, the benefits of the method according to the present example embodiment would quickly expand.

If further simplification is required, the policy tree can be further transformed. As is illustrated in FIG. 3d, both the remaining inner nodes 302 and 303 may be further replaced by a single functional expression F4, representing a remote query intended for RAS1 107a and containing an attribute available from RAS2 107b. Such a remote query may comprise a statement like:

```
SELECT COUNT(*) AS I3
FROM tblResourceOwner AS rown
INNER JOIN tblResourceOrganization AS rorg
    ON rown.ResourceId = rorg.ResourceId
WHERE rown.Owner = @SubjectId
    AND rorg.Organization = @SubjectOrganization
    AND rorg.ResourceId = @ResourceId;
``` which will, after the value of @SubjectOrganization is substituted and the remote query is executed in RAS1 107a, return a single integer I3 with a value corresponding to the evaluation of the full sub-branch 300 (the node 301). This is completed after merely sending a single query to RAS1 107a (and one query to RAS2 107b), to be compared with the at least three queries and multiple comparison operations needed in a conventional method.

Figure 3E:
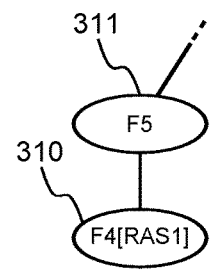

If required during evaluation, the method of transformation according to the present invention may also involve the step of inserting a functional expression that outputs a value translated into a language that e.g. an evaluating PDP 500 is guaranteed to understand. Such an expression may, e.g., be configured to receive the output data from the execution of a remote query represented by another functional expression, and to transform such data to a an ABAC-specific data type. In the examples given in the description, this may include converting the outputted integer values from the queries into e.g. a "Permit" or "Deny". An example is illustrated in FIG. 3e, where the functional expression 311 (F5) receives the output of the query, intended for RAS1 107a, represented by the functional expression 310 (F4).

Figure 7:
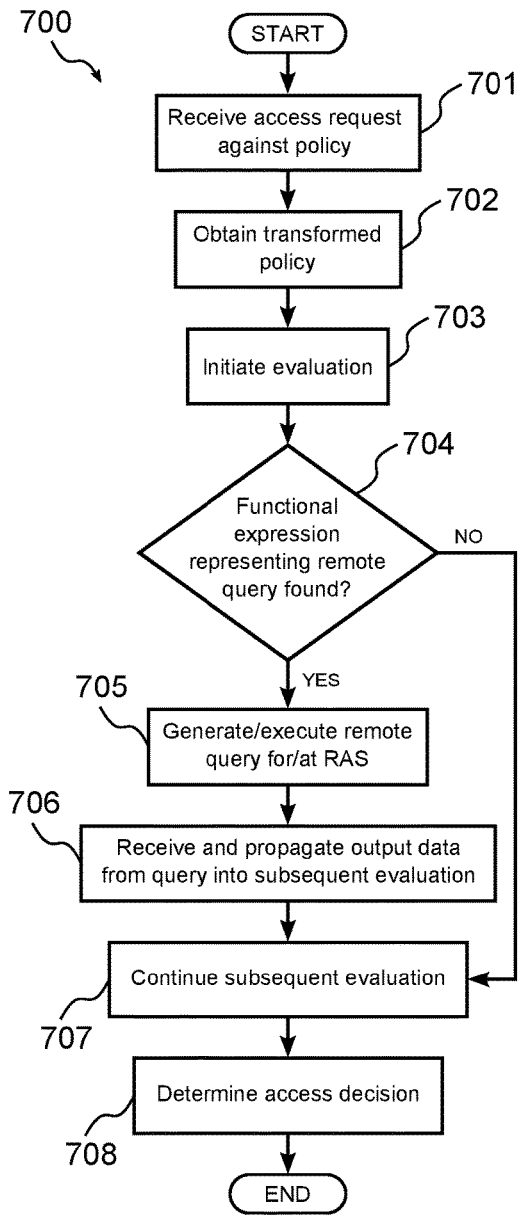
FIG. 7 is a flowchart of a method of evaluating an ABAC policy in accordance with an example embodiment.

FIG. 7 illustrates, in accordance with another aspect of the present invention, a computer-implemented method 700 of evaluating an access request against an ABAC policy 106. After receiving an access request 105 intended for a certain ABAC policy 106 (step 701), a transformed policy 106' (transformed according to the present invention) equivalent to the policy 106 is obtained (step 702). After the evaluation has been initiated (step 703), the evaluator (i.e., the PDP 500) traverses the transformed policy 106' and searches for functional expressions representing remote queries. If such a functional expression is found (step 704), the evaluator uses the functional expression (and the information therein) to generate, if needed, a remote query for an intended RAS (step 705). Depending on the exact form of the query, the query can either be executed at the intended RAS right away, or some modifications are required to be done first. A remote query can, at this stage, have a template form where values for certain attributes are to be inserted before execution of the query is possible. As an example, if a query on the form:

```
SELECT COUNT(*) AS I1 FROM tblResourceOwner WHERE
ResourceId = @ResourceId AND Owner = @SubjectId;
``` is encountered, values for @ResourceId and @SubjectId must be inserted. If we assume that ResourceId=37, and SubjectId=12, this can be done in different ways, including both changing the query itself, as per:

```
SELECT COUNT(*) AS I1 FROM tblResourceOwner
WHERE ResourceId = 37 AND Owner = 12;
``` or by e.g. adding an extra query telling the RAS to use the correct values when executing the query, e.g. by adding a query on the form:

DECLARE @ResourceId INT=37; DECLARE @SubjectId INT=12;

that is to be executed first. This step may include first sending queries to other RASs in order to receive attribute values that need to be included in the remote query. Once the query is generated, the query is submitted to the intended RAS. After the output data are received back, the output data are propagated into the subsequent evaluation of the policy (step 706). This may include making further modifications to the policy, such as inserting/removing functional expressions and converting data types to types understood by the evaluator. Next, the subsequent evaluation of the (transformed) policy is continued (step 707). The evaluator can choose to search for additional functional expressions representing remote queries, or end the evaluation by returning an access decision (step 708). If, during the initial search, no functional expression representing a remote query is found, the evaluator may proceed straight to the subsequent evaluation (step 707).

Figure 8:
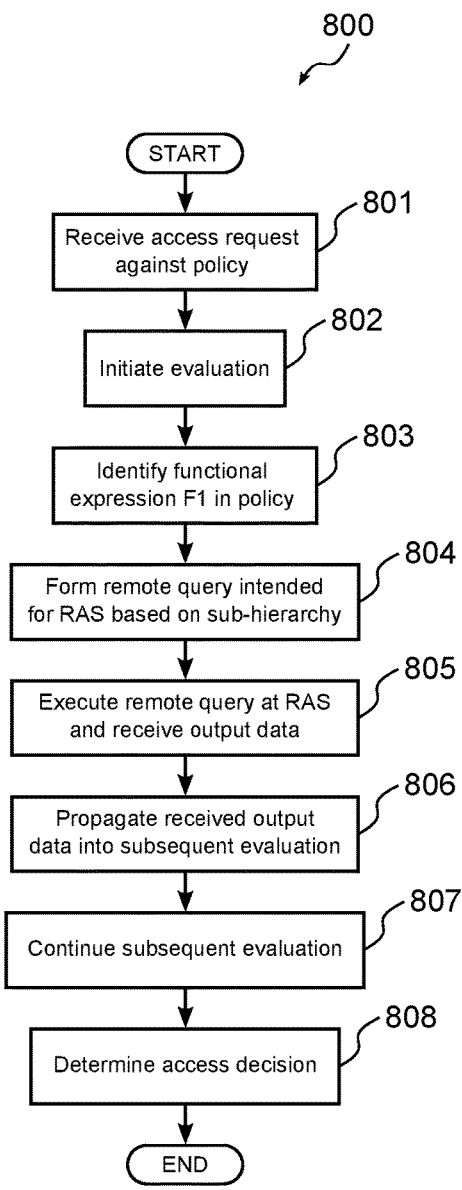
FIG. 8 is a flowchart of another method of evaluating an ABAC policy in accordance with an example embodiment.

As shown in flowchart form in FIG. 8, a further example embodiment provides a method 800 for evaluating an access request 105 against said policy 106. In the method, a transformation of the full policy 106 is not needed in advance. In the method 800, after receiving an access request (step 801) and initiating the evaluation of the policy 106 (step 802), sub-hierarchies suitable for remote evaluation are searched for and functional expressions being hierarchs in these sub-hierarchies are identified (step 803). Like in the transformation-focused method 600 outlined earlier, a corresponding remote query is then formed intended for a certain RAS (step 804), and the remote query is then executed at the intended RAS and the output data are received (step 805). After the output data have been received, the data are propagated into the subsequent evaluation (step 806). Like previously, this step involves performing optional steps wherein e.g. functional expressions are inserted/removed, and wherein datatypes are converted into more suitable formats, such as different datatypes. The subsequent evaluation of the policy 106 is then continued (step 807) and, optionally, additional sub-hierarchies suitable for remote evaluation are search for and dealt with accordingly. Finally, an access decision 108 is returned (step 808) to conclude the evaluation. Using this method, policies can be partially transformed dynamically on an on-demand basis, and the need for e.g. a policy transformer 400 is at least partially eliminated.

Figure 5:
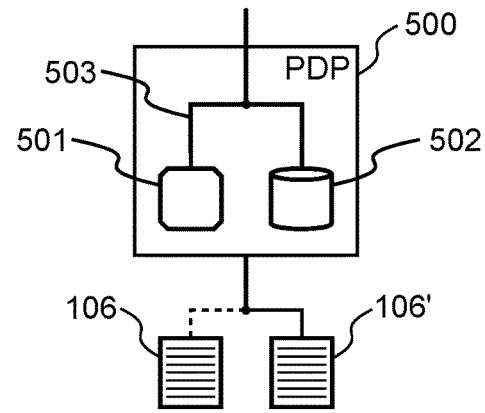
FIG. 5 is a block diagram of a PDP, in accordance with an example embodiment.

A PDP 500 adapted to evaluate an ABAC policy, according to an example embodiment, is illustrated in FIG. 5. The PDP comprises a processor 501 that is configured to perform the steps of the method of evaluations outlined above, using a working memory 502 to which the PDP 500 is communicatively coupled via a communication link 503. As is illustrated in the figure, the PDP 500 may obtain a transformed version 106' of a policy 106 when needed. The PDP 500 may also (not shown) perform the steps of evaluating the ABAC policy 106 dynamically, on an on-demand basis, eliminating the need of a transformed policy 106'.

Further Example Embodiments. Closing Remarks

Advantageous example embodiments further include the following:

E1. An ABAC policy transformer (400) configured to transform an attribute-based access control, ABAC, policy (106) to facilitate evaluation in a policy decision point (PDP; 500) of an access request (105) against the ABAC policy (106), wherein the PDP (500) is communicatively connected over a communication link (503) to at least one remote attribute source (RAS; 107), wherein the ABAC policy (106) comprises hierarchically ordered functional expressions, one or more of the functional expressions having at least one other functional expression and/or at least one attribute as a subordinate, the value of each attribute being either locally available at the PDP (500) or remotely available in response to a query submitted from the PDP (500) to one of said at least one RAS (107), the ABAC policy transformer (400) comprising:
a memory (402); and
a processor (401) configured to:
identify, in the ABAC policy (106), a first functional expression (F1) comprising at least one mathematical operator;
form, on the basis of a sub-hierarchy having said first functional expression (F1) as its hierarch, a remote query intended for a first RAS (107a) in such manner that output data from execution of the remote query correspond to the outcome of an evaluation of the first functional expression (F1); and
transform the ABAC policy (106) by replacing the remotely executable sub-hierarchy by a second functional expression (F2) representing the remote query.

E2. A policy decision point (PDP; 500), which is communicatively coupled over a communication link (503) to at least one remote attribute source (RAS; 107) and which is adapted to evaluate an access request (105) against an attribute-based access control, ABAC, policy (106) comprising hierarchically ordered functional expressions, each functional expression having at least one other functional expression and/or at least one attribute as a subordinate, the value of each attribute being either locally available at the PDP (500) or remotely available in response to a query submitted from the PDP (500) to one of said at least one RAS (107), the PDP (500) comprising:
a memory (502); and
a processor (501) configured to:
receive an access request (105) intended for an ABAC policy (106);
obtain a transformed ABAC policy (106') equivalent to said ABAC policy (106), the transformed ABAC policy (106') comprising at least one functional expression representing a remote query to one of said at least one RAS (107a); and
initiate evaluation of the access request (105) against the transformed ABAC policy (106'), including generating, in response to encountering said functional expression, the remote query to said one RAS (107a), executing the query and receiving output data resulting from the execution, wherein the received output data are propagated into the subsequent evaluation of the access request (105).

E3. A policy decision point (PDP; 500), which is communicatively coupled over a communication link (503) to at least one remote attribute source (RAS; 107) and which is adapted to evaluate an access request (105) against an attribute-based access control, ABAC, policy (106) comprising hierarchically ordered functional expressions, each functional expression having at least one other functional expression and/or at least one attribute as a subordinate, the value of each attribute being either locally available at the PDP (500) or remotely available in response to a query submitted from the PDP (500) to one of said at least one RAS (107), the PDP (500) comprising:
a memory (502); and
a processor (501) configured to:
receive an access request (105) intended for an ABAC policy (106);
initiate evaluation of the access request (105) against the ABAC policy (106), including to identify, in the ABAC policy (106), a first functional expression (F1) comprising at least one mathematical operator;
form, on the basis of a sub-hierarchy having said first functional expression (F1) as its hierarch, a remote query intended for a first RAS (107a) in such manner that output data from execution of the remote query correspond to the outcome of an evaluation of the first functional expression (F1); and
execute the remote query and receive output data from the execution, wherein the received output data are propagated into the subsequent evaluation of the access request (105).

E4. A computer program product comprising a computer-readable medium with instructions for causing a programmable computer to perform the method of any of below claims 1 to 12, 14 to 17 and 19.

Still further embodiments of the present invention will become apparent to a person skilled in the art after studying the description above. Even though the present description and drawings disclose embodiments and examples, the invention is not restricted to these specific examples. Numerous modifications and variations can be made without departing from the scope of the present invention, which is defined by the accompanying claims. Any reference signs appearing in the claims are not to be understood as limiting their scope.

The devices and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A computer-implemented method in an attribute-based access control policy (ABAC) transformer of transforming an ABAC policy to facilitate evaluation in a policy decision point (PDP) of an access request against the ABAC policy,
   wherein the PDP is communicatively coupled over a communication link to at least one remote attribute source (RAS), and
   wherein the ABAC policy comprises hierarchically ordered functional expressions, one or more of the functional expressions having at least one other functional expression and/or at least one attribute as a subordinate, the value of each attribute being either locally available at the PDP or remotely available in response to a query submitted from the PDP to one of said at least one RAS,
   the method comprising:
      a processor in the ABAC policy transformer identifying, in the ABAC policy, a first functional expression comprising at least one mathematical operator;
      the processor in the ABAC policy transformer forming, on the basis of a sub-hierarchy having said first functional expression as its hierarch, a remote query intended for a first RAS in such manner that output data from execution of the remote query correspond to the outcome of an evaluation of the first functional expression; and the processor in the ABAC policy transformer transforming the ABAC policy by replacing the sub-hierarchy by a second functional expression representing the remote query.

2. The method of claim 1, wherein the second functional expression comprises at least one attribute whose value is remotely available only from a RAS other than the first RAS.

3. The method of claim 1, wherein the sub-hierarchy is remotely executable in the first RAS.

4. The method of claim 3, wherein the first functional expression is determined by the processor in the ABAC policy transformer by searching, among the hierarchically ordered functional expressions of the ABAC policy, for a functional expression having a subordinate attribute that is available from a RAS and being such that any further subordinate attribute is either locally available or available from said RAS.

5. The method of claim 3, wherein the remotely executable sub-hierarchy is maximal.

6. The method of claim 3, wherein the second functional expression comprises an attribute which is locally available at the PDP.

7. The method of claim 3, wherein the second functional expression is evaluable without requiring attribute values from any RAS.

8. The method of claim 1, wherein said forming the remote query by the processor in the ABAC policy transformer includes the processor in the ABAC policy transformer determining a type of the RAS and selecting a language in which to form the remote query in accordance herewith.

9. The method of claim 1, wherein the first RAS is one of: an SQL database, an LDAP directory, an OData service, an RDF database, a Hive service, or a combination thereof.

10. The method of claim 1, wherein:
the second functional expression represents a remote query returning output data in conformity with a standard data type; and
the transformed policy further comprises a third functional expression, to which the second functional expression is subordinate, which third functional expression is configured to receive the output data from execution of the remote query and to output, based thereon, a value in conformity with an ABAC-specific data type.

11. The method of claim 10, wherein the third functional expression is configured to return an access decision, preferably one of: Permit, Deny.

12. The method of claim 1, wherein at least one of the attributes referenced by the remotely executable sub-hierarchy is a multiple-valued attribute.

13. An attribute-based access control (ABAC) policy transformer configured to transform a ABAC policy to facilitate evaluation in a policy decision point (PDP) of an access request against the ABAC policy, wherein the PDP is communicatively connected over a communication link to at least one remote attribute source (RAS),
wherein the ABAC policy comprises hierarchically ordered functional expressions, one or more of the functional expressions having at least one other functional expression and/or at least one attribute as a subordinate, the value of each attribute being either locally available at the PDP or remotely available in response to a query submitted from the PDP to one of said at least one RAS,
the ABAC policy transformer comprising:
a memory; and
a processor configured to:
identify, in the ABAC policy, a first functional expression comprising at least one mathematical operator;
form, on the basis of a sub-hierarchy having said first functional expression as its hierarch, a remote query intended for a first RAS in such manner that output data from execution of the remote query correspond to the outcome of an evaluation of the first functional expression; and
transform the ABAC policy by replacing the remotely executable sub-hierarchy by a second functional expression representing the remote query.

14. A computer-implemented method of evaluating an access request against an attribute-based access control (ABAC) policy,
wherein the method is implemented in a policy decision point (PDP), which is communicatively coupled over a communication link to at least one remote attribute source (RAS), and
wherein the ABAC policy comprises hierarchically ordered functional expressions, each functional expression having at least one other functional expression and/or at least one attribute as a subordinate, the value of each attribute being either locally available at the PDP or remotely available in response to a query submitted from the PDP to one of said at least one RAS,
the method comprising:
i) a processor in the PDP receiving an access request intended for an ABAC policy;
ii) the processor in the PDP obtaining a transformed ABAC policy equivalent to said ABAC policy, the transformed ABAC policy comprising at least one functional expression representing a remote query to one of said at least one RAS; and
iii) the processor in the PDP initiating evaluation of the access request against the transformed ABAC policy, including generating, in response to encountering said functional expression, the remote query to said one RAS, executing the query and receiving output data resulting from the execution, wherein the received output data are propagated into the subsequent evaluation of the access request.

15. The method of claim 14, wherein step iii includes the processor in the PDP assigning an access decision in response to the received output data resulting from the execution of the remote query and propagating the access decision into the subsequent evaluation of the access request, the access decision preferably being one of: Permit, Deny.

16. The method of claim 14, wherein said functional expression representing a remote query to one of said at least one RAS represents a remote query which comprises at least one attribute, the method further comprising the processor in the PDP generating the remote query on the basis of a value of said at least one attribute.

17. The method of claim 16, wherein the PDP is communicatively coupled to at least two RASs and the remote query comprises at least one attribute whose value is remotely available only from a RAS other than said one RAS, the method further comprising the processor in the PDP retrieving an attribute value from said other RAS and then generating the remote query on the basis of the retrieved attribute value.

18. A policy decision point (PDP), which is communicatively coupled over a communication link to at least one remote attribute source (RAS) and which is adapted to evaluate an access request against an attribute-based access control (ABAC) policy comprising hierarchically ordered functional expressions, each functional expression having at least one other functional expression and/or at least one attribute as a subordinate, the value of each attribute being either locally available at the PDP or remotely available in response to a query submitted from the PDP to one of said at least one RAS,
the PDP comprising:
a memory; and
a processor configured to:
receive an access request intended for an ABAC policy;
obtain a transformed ABAC policy equivalent to said ABAC policy, the transformed ABAC policy comprising at least one functional expression representing a remote query to one of said at least one RAS; and
initiate evaluation of the access request against the transformed ABAC policy, including generating, in response to encountering said functional expression, the remote query to said one RAS, executing the query and receiving output data resulting from the execution, wherein the received output data are propagated into the subsequent evaluation of the access request.

19. A computer-implemented method of evaluating an access request against an attribute-based access control (ABAC) policy in a policy decision point (PDP),
wherein the PDP is communicatively coupled over a communication link to at least one remote attribute source (RAS), and
wherein the ABAC policy comprises hierarchically ordered functional expressions, one or more of the functional expressions having at least one other functional expression and/or at least one attribute as a subordinate, the value of each attribute being either locally available at the PDP or remotely available in response to a query submitted from the PDP to one of said at least one RAS,
the method comprising:
i) a processor in the PDP receiving an access request intended for the ABAC policy;
ii) the processor in the PDP initiating evaluation of the access request against the ABAC policy, including identifying, in the ABAC policy, a first functional expression comprising at least one mathematical operator;

iii) the processor in the PDP forming, on the basis of a sub-hierarchy having said first functional expression as its hierarch, a remote query intended for a first RAS in such manner that output data from execution of the remote query correspond to the outcome of an evaluation of the first functional expression; and
iv) the processor in the PDP executing the remote query and receiving output data from the execution, wherein the received output data are propagated into the subsequent evaluation of the access request.

20. A policy decision point (PDP), which is communicatively coupled over a communication link to at least one remote attribute source (RAS) and which is adapted to evaluate an access request against an attribute-based access control, ABAC, policy comprising hierarchically ordered functional expressions, each functional expression having at least one other functional expression and/or at least one attribute as a subordinate, the value of each attribute being either locally available at the PDP or remotely available in response to a query submitted from the PDP to one of said at least one RAS,
the PDP comprising:
a memory; and
a processor configured to:
receive an access request intended for an ABAC policy;
initiate evaluation of the access request against the ABAC policy, including to identify, in the ABAC policy, a first functional expression comprising at least one mathematical operator;
form, on the basis of a sub-hierarchy having said first functional expression as its hierarch, a remote query intended for a first RAS in such manner that output data from execution of the remote query correspond to the outcome of an evaluation of the first functional expression; and
execute the remote query and receive output data from the execution, wherein the received output data are propagated into the subsequent evaluation of the access request.

21. A computer program product comprising a non-transitory computer-readable medium with instructions for causing a programmable computer to perform the method of claim 1.

22. A computer program product comprising a non-transitory computer-readable medium with instructions for causing a programmable computer to perform the method of claim 14.

23. A computer program product comprising a non-transitory computer-readable medium with instructions for causing a programmable computer to perform the method of claim 19.

* * * * *